United States Patent [19]
McCahon et al.

[11] 3,783,991
[45] Jan. 8, 1974

[54] CONVEYOR

[75] Inventors: John O. McCahon, West Simsbury, Conn.; William J. Byrne, Pearl River, N.Y.

[73] Assignee: Smyth Manufacturing Company, Bloomfield, Conn.

[22] Filed: July 2, 1971

[21] Appl. No.: 159,227

Related U.S. Application Data

[62] Division of Ser. No. 706,926, Feb. 20, 1968, Pat. No. 3,591,165.

[52] U.S. Cl............................ 198/33 AB, 198/180
[51] Int. Cl....................... B65g 17/48, B65g 47/24
[58] Field of Search .............. 198/33 AB, 179, 180; 271/79

[56] References Cited
UNITED STATES PATENTS

| | | | |
|---|---|---|---|
| 2,940,581 | 6/1960 | Chebuhar...................... | 198/33 AB |
| 3,121,362 | 2/1964 | Shepherd....................... | 198/180 X |
| 2,942,719 | 6/1960 | Bofinger......................... | 198/180 X |

*Primary Examiner*—Edward A. Sroka
*Attorney*—Dale A. Bauer

[57] ABSTRACT

Apparatus for conveying sheet material or the like in suspension comprising clamping means adapted to be opened, closed and rotated in response to movement thereof.

5 Claims, 9 Drawing Figures

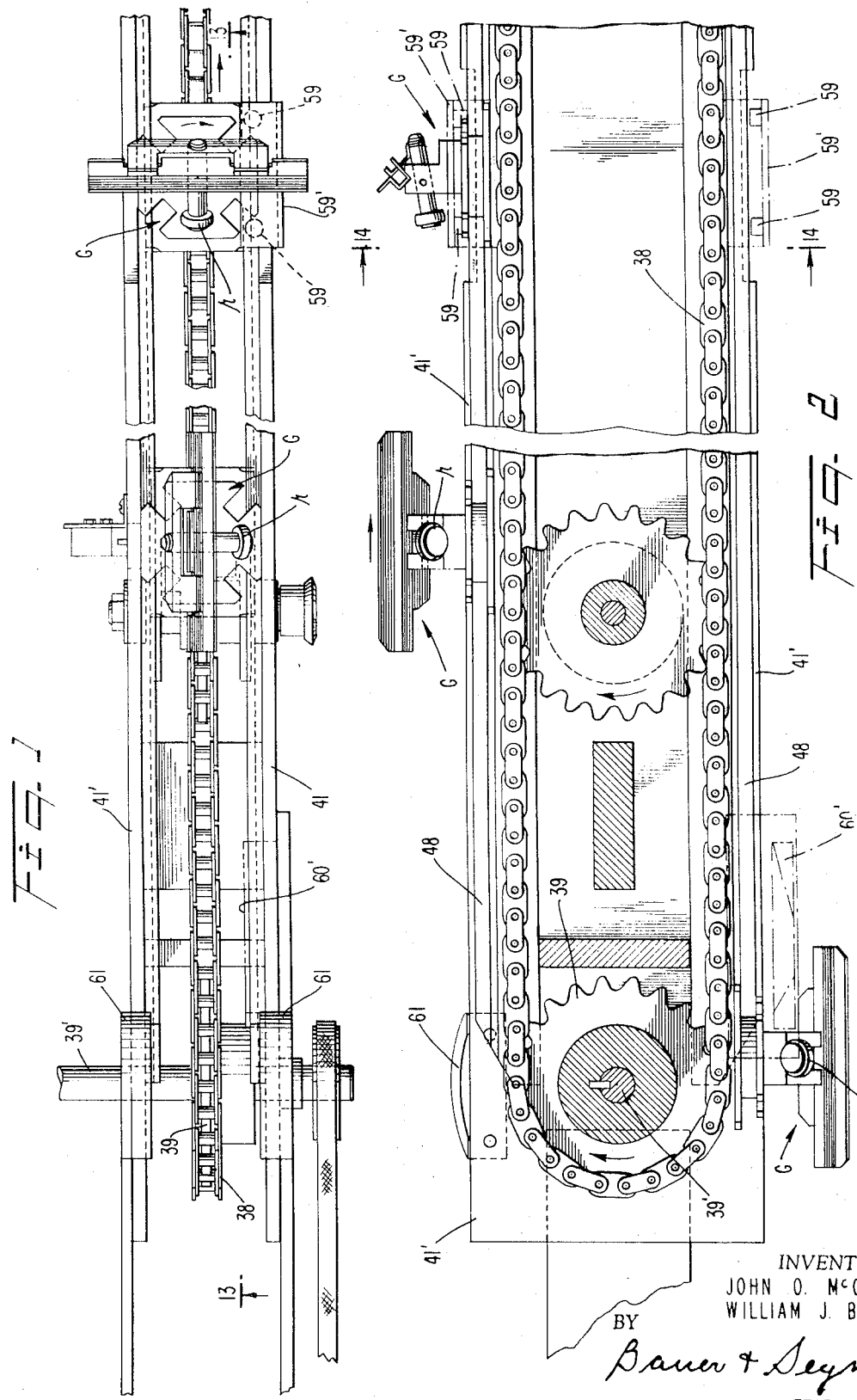

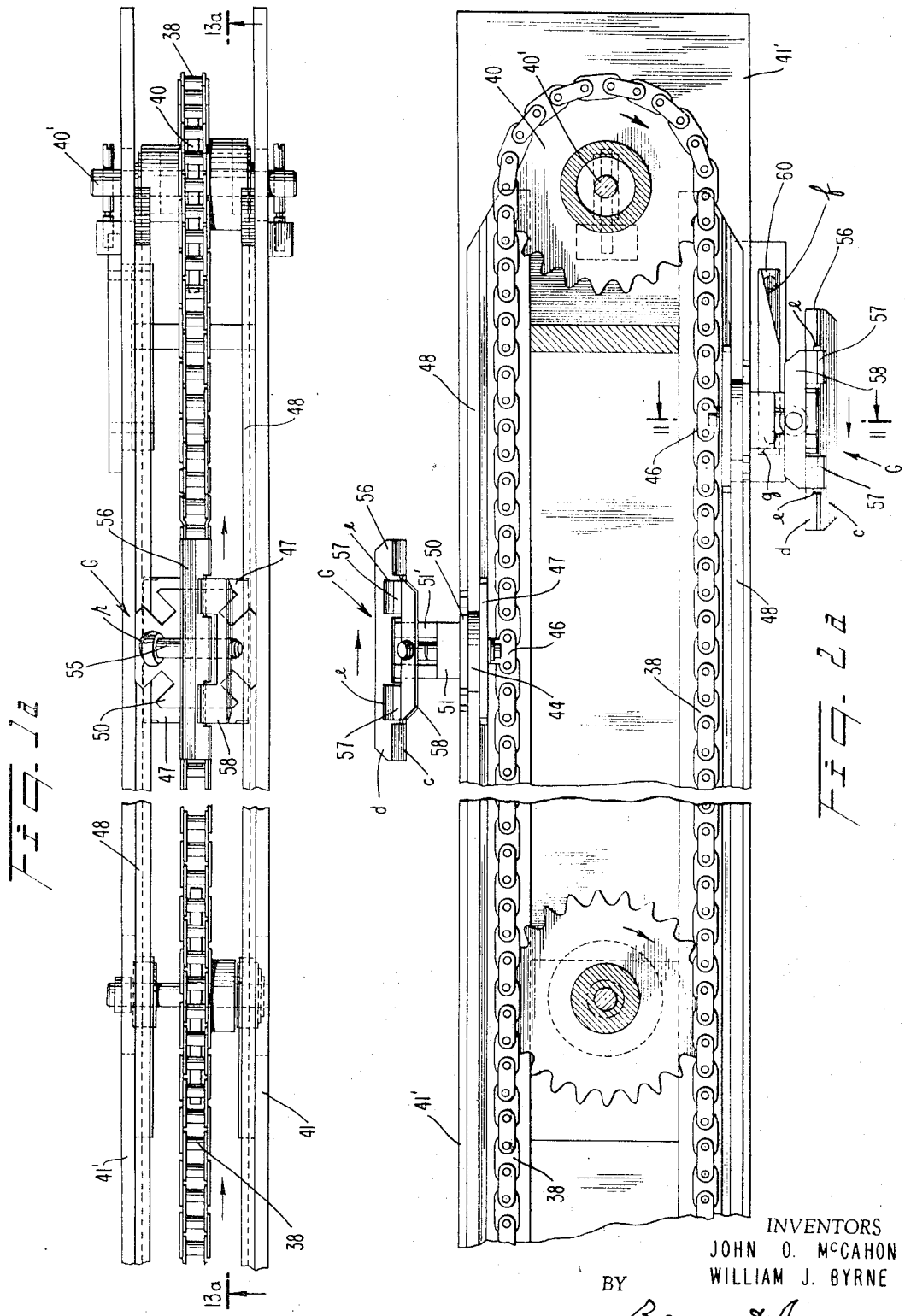

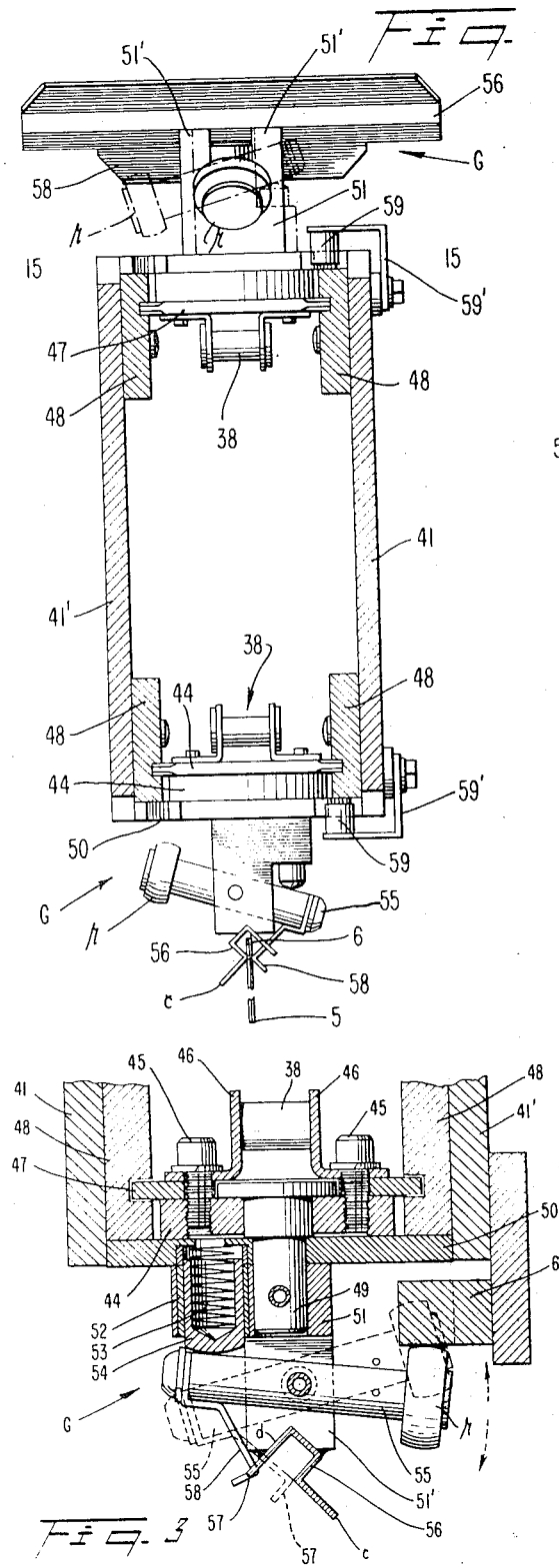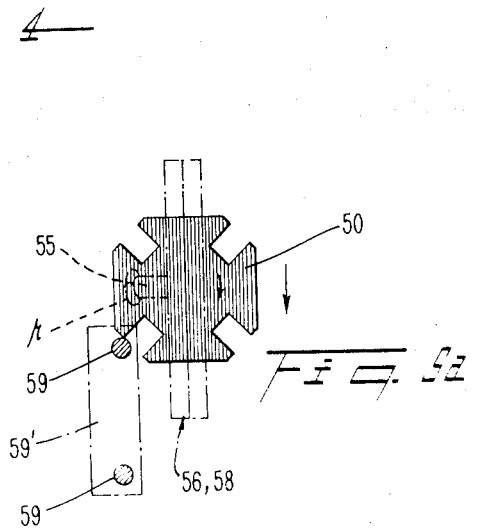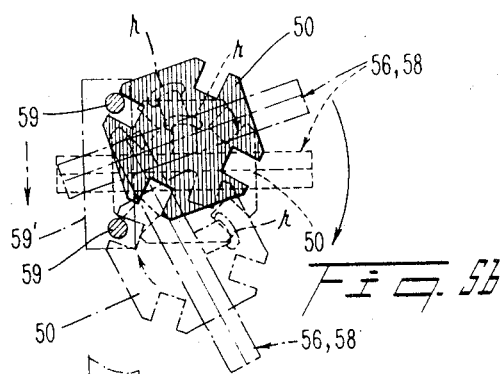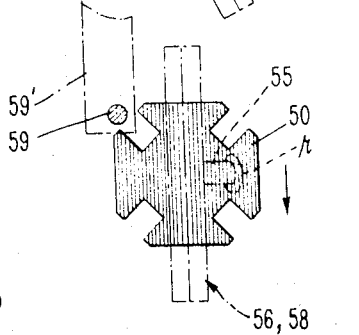

CONVEYOR

This application is a division of our parent copending application Ser. No. 706,926, filed Feb. 20, 1968, for "Method and Apparatus for Handling Sheet Material, Signatures and the Like." (now U.S. Pat. No. 3,591,165).

The present invention relates to a method and apparatus for automatically handling sheet material, signatures and the like and more particularly to conveyor means therefor.

One of the objects of the present invention is to provide novelly constructed means for handling folded signatures in a novel manner.

Another object of the invention is to provide novel conveyor means for supporting signatures in suspension and moving the same edgewise.

Still another object is to provide novel apparatus for turning signatures end-for-end while the same are being simultaneously linearly conveyed.

The above and further objects and novel features of the present invention will more fully appear from the following detailed description when the same is read in connection with the accompanying drawings. It is to be expressly understood, however, that the drawings are for the purpose of illustration only and are not intended as a definition of the limits of the invention.

In the drawings, wherein like reference characters refer to like parts throughout the several views, FIGS. 1 and 1a are complementary top plan views with parts broken away of opposite ends of the gripper conveyor embodying one form of the invention;

FIGS. 2 and 2a are front elevation views partially in section taken substantially on lines 13—13 and 13a—13a of FIG. 1 and FIG. 1a, respectively;

FIG. 3 is a detail sectional view of one suitable form of signature gripping device, the section being taken on line 11—11 of FIG. 2a;

FIG. 4 is a sectional view taken on line 14—14 of FIG. 2; and

FIGS. 5a, 5b and 5c are diagrams illustrating successive positions of a gripper device as viewed from the plane of line 15—15 of FIG. 4 while rotating through an angle of 180°.

The endless gripper conveyor illustrated in the drawings, by way of example, if of novel construction and in the form shown comprises a single endless belt or chain 38 supported primarily by a driving sprocket 39 and an idler sprocket 40 mounted on horizontal shafts 39' and 40', respectively, journalled in parallel beams or rails 41 and 41'. Sprocket 39 and hence, conveyor chain 38 may be driven in a clockwise direction as viewed in FIGS. 2 and 2a by any suitable known means.

Chain 38 carries a plurality of equally spaced novelly constructed signature gripping devices G including signature clamps capable of pivoting or rotating relative to the chain. In the form illustrated each gripper mechanism, the details of which are shown in FIG. 3, is rotatably supported by a swivel plate 44 secured by stud bolts 45 to ears extending laterally from special links 46 of the chain. Plate 44 is spaced from said ears by a thin flat plate 47, the edges of which ride in grooves in elongated bars 48 secured to the inner adjacent faces of beams 41, 41' (FIG. 4) near the upper and lower edges thereof. The guide plates 47 and bars 48 thus serve to provide support for the upper and lower reaches of chain 38 to prevent sagging thereof. A pivot pin 49 is journalled in an opening in swivel plate 44 and has a flange or enlarged head which rests on the swivel plate within a hole through guide plate 47. Mounted on the reduced projecting end of pin 49 for rotation therewith is a generally square Geneva gear plate 50 having bevelled corners and radial corner slots (FIGS. 1 and 5a) and a bifurcated body member 51 (FIGS. 3 and 4) secured to the pin by any suitable means such as a transverse dowel. Plate 50 and member 51 are linked together by tube 52 which provides a recess for a compression spring 53 and a plunger 54 urged outwardly by the spring.

The outer end of spring pressed plunger 54 engages a clamp bar 55 pivotally mounted between the furcations 51' of member 51 and is effective to normally hold said bar in the dotted line position shown in FIG. 3. A generally channel-shaped gripper jaw 56 is suitably secured, such as by welding, across the outer ends of the body member furcations 51'. When a swivel gripper mechanism G is suspended from the lower reach of chain 38, the fixed jaw 56 forms in effect an inverted V with an inclined skirt $c$ to guide and receive the upper edge 6 of a signature 5 that is fed upwardly thereto, such as by rotating drums in the manner described in our above-mentioned copending application. The inclined side $d$ of jaw 56 has a plurality of slots $e$ (FIG. 2a) to receive the angle shaped fingers 57 of a cooperating movable clamping jaw 58 mounted on one end of bar 55. A cam follower roller $r$ is mounted on the other end of bar 55 for engagement with a cam bar 60 adjustably mounted on the lower edge of beam 41' (FIGS. 2a and 3).

When a clamping or gripping device G approaches the bottom of sprocket 40, the guide plate 47 thereof enters the grooves in lower bars 48 and roller $r$ engages the inclined surface $f$ of cam bar 60 (FIG. 2a) to thereby pivot bar 55 and clamping jaw 58 to the full line position in FIG. 3 whereby the jaws 56 and 58 are separated or opened for receiving the edge 6 of an upwardly fed sheet or signature 5. When the roller $r$ rides off the more sharply inclined surface $g$ at the other end of the cam bar 60, the clamping jaw 57 is rapidly moved to the dotted line clamping position (FIGS. 3 and 4) against the signature 5 by spring plunger 54.

While the suspended signature is being horizontally advanced by the conveyor, the same may be automatically opened to its center in a manner fully described in the above-mentioned parent application, the entire disclosure of which is incorporated herein by reference. Before the opened signature is deposited onto a saddle it may be desirable to turn the same through a half or quarter revolution. Novel means provided for this purpose comprise the Geneva gear plate 50 the edge portions of which preferably overlap the outer edges of grooved guide bars 48. At the location where it is desired to effect the turning of the gripper jaws 56–58 and hence, the signature clamped thereby, there is provided one or more indexing posts 59, two being shown, for effecting a half revolution turn (FIGS. 1 and 4). As shown, these posts are mounted on a right angle bracket 59' secured to beam 41 and extend into the path of one edge of the Geneva gear plate 50 for cooperation with the radial slots in the corners thereof in a conventional manner, so that a quarter turn of the clamp 56, 58 is effected by each post 59, the latter functioning as stops about which the gear plate pivots in response to linear movement thereof by the conveyor chain 38. Various positions of the gear plate 50 as it approaches and passes indexing posts 59, 59 are illustrated diagrammatically in FIGS. 5a, 5b and 5c. A second bracket 59' with two indexing posts 59 is mounted in inverted position on the upper edge of beam 41 (FIGS. 1 and 4) to index each gripper during the return leg of each conveyor cycle and to thereby restore it to proper orientation for picking up another signature after passing over sprocket 40. Successive positions of a gripper mechanism G, on the upper, return reach of chain 38, as it passes posts 59, 59 are illustrated in FIGS. 5a to 5c.

As each gripper device G approaches the left-hand end (FIG. 1) of the lower reach of chain 38, the cam follower roller r engages a second cam bar 60' which is similar to cam bar 60 and is mounted on the lower edge of beam 41 (FIGS. 1 and 2). The gripper jaws 56, 58 are thus opened to release the opened and rotated signature, permitting it to fall, by way of example, astraddle of an inverted V-shaped saddle conveyor as described in our parent application. Arcuate guides 61 (FIGS. 1 and 2) may be provided at the upper edges of beams 41 and 41' for engagement by Geneva gear plates 50 to direct gripper guide plates 47 into the grooves in the upper guide bars 48 above sprocket 39.

There is thus provided novel apparatus of simplified construction for linearly conveying sheet material, such as folded signatures, in suspended condition and for turning suspended signatures end-for-end while the same are being linearly conveyed.

What is claimed is:

1. Conveyor mechanism comprising spaced parallel rails having oppositely facing longitudinal grooves in adjacent sides thereof, an endless conveyor chain between said rails, sprockets rotatably mounted between said rails for supporting and driving said chain, means secured to a link of said chain including a guide member slidable in said oppositely facing grooves for supporting the reaches of said chain between said sprockets, a clamp comprising separable jaws rotatably supported by said member and resilient means for yieldably holding said jaws in closed clamping position, cam means on said rails for opening said jaws in response to movement of the chain, and means responsive to the movement of said chain for rotating said clamp relative to the chain, said last-named means comprising a Geneva gear and stationary pins mounted on a said rail and cooperable with said gear and said gear being held against rotation by said rails during a major portion of each cycle of the chain.

2. Conveyor mechanism comprising an endless chain consisting of a connected series of uniform links forming a closed loop, sprockets with uniformly spaced teeth meshing with said chain for supporting and driving said chain, means including a guide member mounted on a link of said chain and a guideway cooperable therewith for supporting the reaches of the chain between sprockets, clamping means supported by and rotatable relative to said guide member, said clamping means comprising a rotatable body assembly, separable clamping jaws mounted on said assembly for rotation therewith and means responsive to movement of the chain for opening and closing said jaws, means responsive to movement of the chain for rotating said assembly, said last-named means comprising stationary lugs and a Geneva gear cooperable therewith, said gear being secured to said assembly for rotation therewith and being of generally square peripheral contour with diagonally extending slots at the corners thereof to receive said lugs, and said guide member, gear and clamping means being mounted outside of said loop.

3. Conveyor mechanism as defined in claim 2 wherein said means for opening and closing said jaws comprises resilient means mounted on said assembly for normally holding said jaws in closed position.

4. Conveyor mechanism as defined in claim 3 wherein said means for opening and closing said jaws comprises cam means for opening said jaws.

5. Conveyor mechanism as defined in claim 2 wherein one said jaw is pivotally mounted on said assembly and another said jaw is fixedly mounted on said assembly and said means for opening and closing said jaws comprises resilient means for urging said pivoted jaw in one direction and cam means for pivoting the pivoted jaw in opposition to said resilient means.

* * * * *